(12) United States Patent
Zargahi et al.

(10) Patent No.: US 11,057,102 B2
(45) Date of Patent: Jul. 6, 2021

(54) ON-PLATFORM ANALYTICS

(71) Applicant: Microsoft Technology Licensing, LLC, Redmond, WA (US)

(72) Inventors: Kamran Rajabi Zargahi, Seattle, WA (US); Ranveer Chandra, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 232 days.

(21) Appl. No.: 16/427,264

(22) Filed: May 30, 2019

(65) Prior Publication Data

US 2020/0336202 A1    Oct. 22, 2020

Related U.S. Application Data

(60) Provisional application No. 62/836,057, filed on Apr. 18, 2019.

(51) Int. Cl.
*H04B 7/185* (2006.01)
*G06K 9/00* (2006.01)
(Continued)

(52) U.S. Cl.
CPC ....... *H04B 7/18584* (2013.01); *G06K 9/0063* (2013.01); *G06K 9/6256* (2013.01);
(Continued)

(58) Field of Classification Search
CPC ............ H04B 7/18584; H04B 7/18517; H04B 7/18513; G06K 9/0063; G06K 9/6256;
(Continued)

(56) References Cited

U.S. PATENT DOCUMENTS 9,819,742 B1 * 11/2017 Coleman ............. H04L 67/1095
9,998,207 B1 *  6/2018 Coleman ............... H04W 40/20
(Continued)

FOREIGN PATENT DOCUMENTS

CN    106383357 A  *  2/2017
CN    108089876 A  *  5/2018
(Continued)

OTHER PUBLICATIONS

LV, et al., "Dynamic Software Updating for Onboard Software", In Proceedings of the Second International Conference on Intelligent System Design and Engineering Application, Jan. 6, 2012, pp. 251-253.
(Continued)

*Primary Examiner* — Mahendra R Patel

(57) ABSTRACT

Solutions for performing on-platform analytics for collected images include: enriching, on-board an orbital platform, collected images using a packaged analytics component; based at least on content of the collected images, selecting a set of the collected images to transmit to a ground station; and transmitting the selected set of the collected images to the ground station. Other solutions include: packaging an analytics component for on-platform execution by a platform in orbit; transmitting, from a ground station to the platform, at least one update selected from the list consisting of: an analytics algorithm update, a machine learning (ML) model, and ML training data; and executing the analytics component with the update. Other solutions include: performing intelligent compression on collected images, wherein the intelligent compression process determines data to transmit to a ground station, based at least on content of the collected images; and transmitting the data to the ground station.

16 Claims, 7 Drawing Sheets

(51) Int. Cl.
　　　*H04N 19/59* (2014.01)
　　　*G06T 7/00* (2017.01)
　　　*G06K 9/62* (2006.01)
　　　*G06N 20/00* (2019.01)

(52) U.S. Cl.
　　　CPC .............. *G06N 20/00* (2019.01); *G06T 7/97* (2017.01); *H04B 7/18517* (2013.01); *H04N 19/59* (2014.11); *G06K 2009/00644* (2013.01); *G06T 2207/10036* (2013.01)

(58) Field of Classification Search
　　　CPC .......... G06K 2009/00644; H04N 19/59; G06T 7/97; G06T 2207/10036; G06N 20/00; G06F 8/65; G06F 16/284; B64C 39/024; H04L 67/18
　　　USPC .......................................................... 370/316
　　　See application file for complete search history.

(56) References Cited

U.S. PATENT DOCUMENTS

| | | | | |
|---|---|---|---|---|
| 10,483,629 | B1* | 11/2019 | Silva | H01Q 1/28 |
| 2011/0275364 | A1* | 11/2011 | Austin | H04L 67/18 |
| | | | | 455/423 |
| 2013/0204528 | A1* | 8/2013 | Okude | G01C 21/3492 |
| | | | | 701/533 |
| 2015/0097084 | A1* | 4/2015 | Szabo | B64G 1/26 |
| | | | | 244/171.1 |
| 2015/0362320 | A1* | 12/2015 | Garrett | G01C 21/02 |
| | | | | 701/510 |
| 2017/0011349 | A1* | 1/2017 | Jones-McFadden | |
| | | | | G06F 3/04842 |
| 2017/0076610 | A1* | 3/2017 | Liu | H04W 4/021 |
| 2017/0155443 | A1* | 6/2017 | Haziza | H04B 1/69 |
| 2017/0187101 | A1* | 6/2017 | Freeman | H01Q 1/3291 |
| 2017/0250750 | A1* | 8/2017 | Franchi | H04B 7/18506 |
| 2017/0250751 | A1* | 8/2017 | Kargieman | G06K 9/46 |
| 2019/0288771 | A1* | 9/2019 | Metzger | H04B 7/18519 |

FOREIGN PATENT DOCUMENTS

| | | | | |
|---|---|---|---|---|
| CN | 108491197 A | * | 9/2018 | |
| EP | 3109659 A1 | * | 12/2016 | .......... G01S 5/0027 |
| EP | 3109659 A1 | | 12/2016 | |

OTHER PUBLICATIONS

"International Search Report and Written Opinion Issued in PCT Application No. PCT/US2020/022369", dated Jun. 29, 2020, 18 Pages.

"International Search Report and Written Opinion Issued in PCT Application No. PCT/US2020/022381", dated May 8, 2020, 22 Pages.

\* cited by examiner

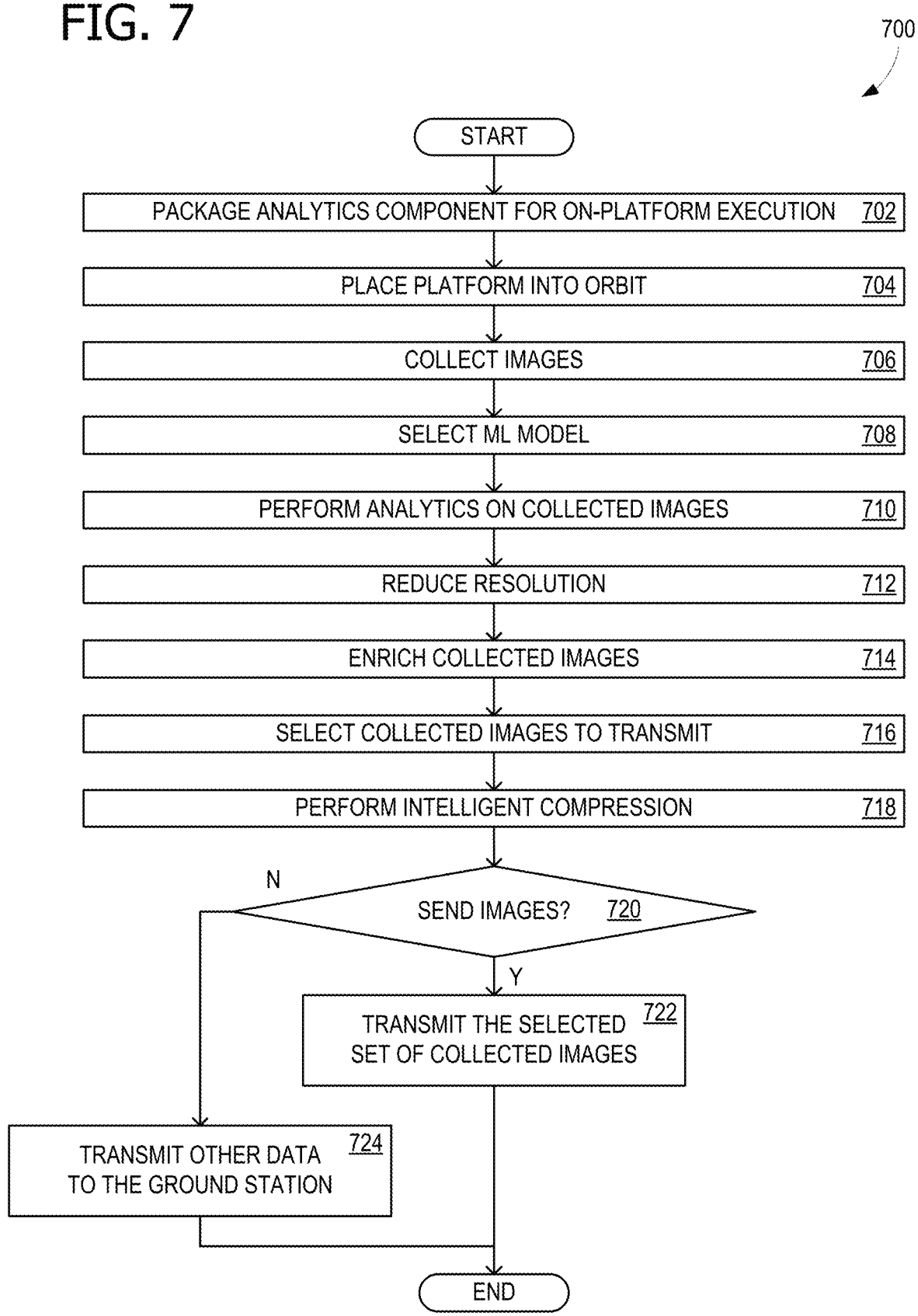

FIG. 8

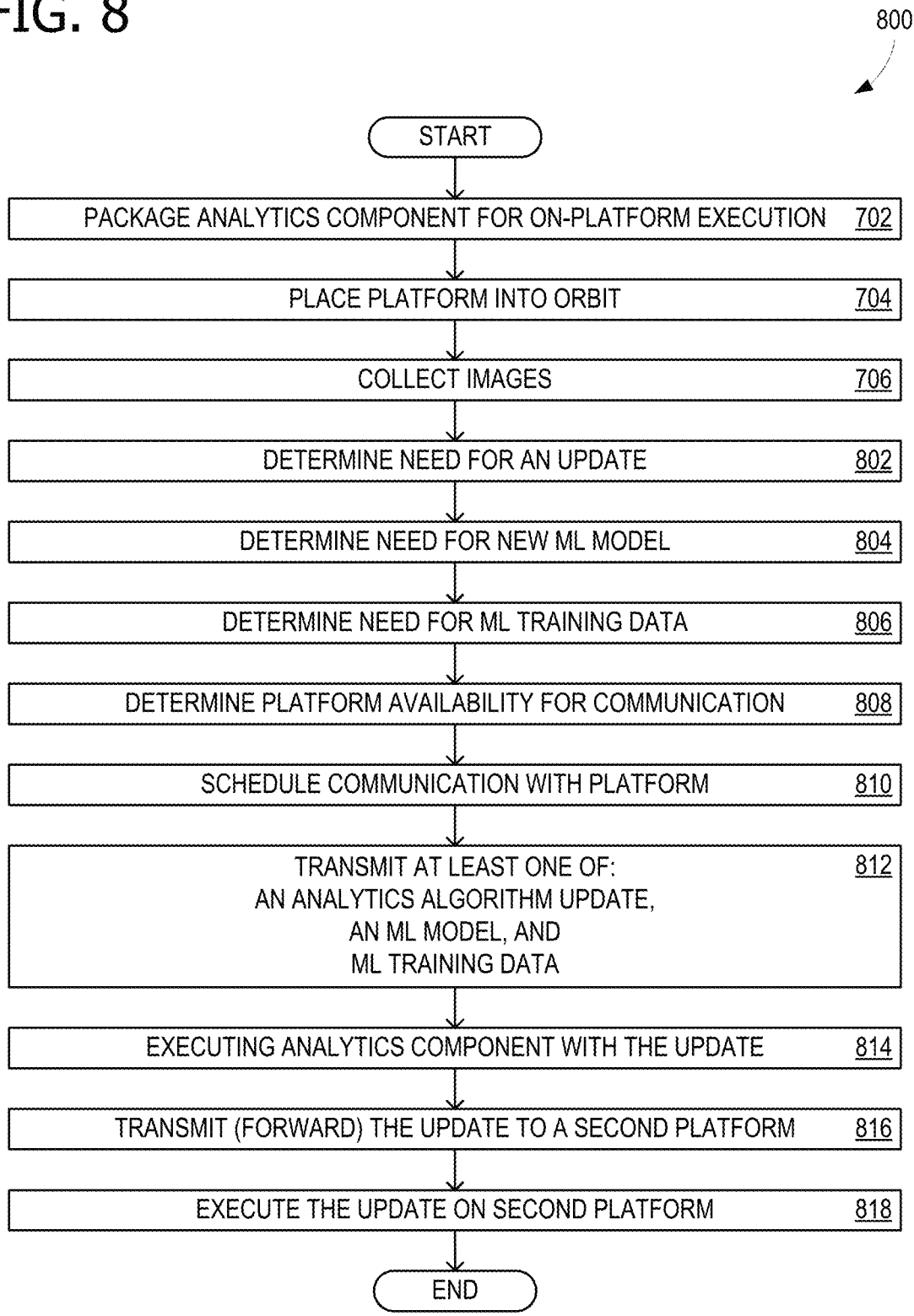

```
                    START
                      ↓
PACKAGE ANALYTICS COMPONENT FOR ON-PLATFORM EXECUTION   702
                      ↓
PLACE PLATFORM INTO ORBIT                               704
                      ↓
COLLECT IMAGES                                          706
                      ↓
DETERMINE NEED FOR AN UPDATE                            802
                      ↓
DETERMINE NEED FOR NEW ML MODEL                         804
                      ↓
DETERMINE NEED FOR ML TRAINING DATA                     806
                      ↓
DETERMINE PLATFORM AVAILABILITY FOR COMMUNICATION       808
                      ↓
SCHEDULE COMMUNICATION WITH PLATFORM                    810
                      ↓
TRANSMIT AT LEAST ONE OF:                               812
AN ANALYTICS ALGORITHM UPDATE,
AN ML MODEL, AND
ML TRAINING DATA
                      ↓
EXECUTING ANALYTICS COMPONENT WITH THE UPDATE           814
                      ↓
TRANSMIT (FORWARD) THE UPDATE TO A SECOND PLATFORM      816
                      ↓
EXECUTE THE UPDATE ON SECOND PLATFORM                   818
                      ↓
                    END
```

ON-PLATFORM ANALYTICS

BACKGROUND

Satellites are a significant data source for multiple verticals, including agriculture, forestry and land use planning, mining, oil and gas, retail forecasting, emergency management, and other commercial uses, in addition to defense and intelligence applications. The collected imagery is often enriched with analytics, such as by detecting objects within the imagery, and annotating the imagery for downstream users. The democratization of earth observation data (EOD) from orbital platforms has expanded the amount of imaging platforms, along with demand for the imagery across multiple industries. This has created challenges, such as stressing communication channels with higher bandwidth demands for the additional imagery.

Additionally, due to the lack of over-flight restrictions for orbital platforms, the possibility of civilian assets imaging sensitive military sites has led to restrictions that limit the resolution of imagery that may be transmitted down to earth. The resolution limits are specified based on ground sample distance (GSD) at the surface of the earth, and currently are 0.25 m for panchromatic imagery and 1.0 m for multispectral GSD on some locations. Thus, there is a possibility that, in some scenarios, some commercial orbital platforms may be required to down-sample collected imagery to a lower resolution prior to transmitting it to a ground station. For example, an orbital platform may be launched with a sensor capable of providing higher resolution than is currently permitted, in anticipation of future relaxation of the resolution limits, or may need to comply with multiple resolution requirements in different geopolitical jurisdictions. This can degrade potential analytics performance relative to what could be possible with raw images from the on-board sensors.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

Some aspects disclosed herein are directed to a solution for on-platform analytics that includes: enriching, on-board an orbital platform, collected images using a packaged analytics component; based at least on content of the collected images, selecting a set of the collected images to transmit to a ground station; and transmitting the selected set of the collected images to the ground station. Some aspects disclosed herein are directed to a solution for on-platform analytics that includes: packaging an analytics component for on-platform execution by a platform in orbit; transmitting, from a ground station to the platform in orbit, at least one update selected from the list consisting of: an analytics algorithm update, a machine learning (ML) model, and ML training data; and executing the analytics component with the update. Some aspects disclosed herein are directed to a solution for on-platform analytics that includes: enriching, on-board an orbital platform, collected images using a packaged analytics component; performing an intelligent compression process on the collected images, wherein the intelligent compression process determines data to transmit to a ground station, based at least on content of the collected images; and transmitting the data to the ground station.

BRIEF DESCRIPTION OF THE DRAWINGS

The disclosed examples are described in detail below with reference to the accompanying drawing figures listed below:

FIG. 7 is a flow chart illustrating exemplary operations involved in on-platform analytics;

FIG. 8 is another flow chart illustrating exemplary operations involved in on-platform analytics.

Corresponding reference characters indicate corresponding parts throughout the drawings.

DETAILED DESCRIPTION

Figure 1:
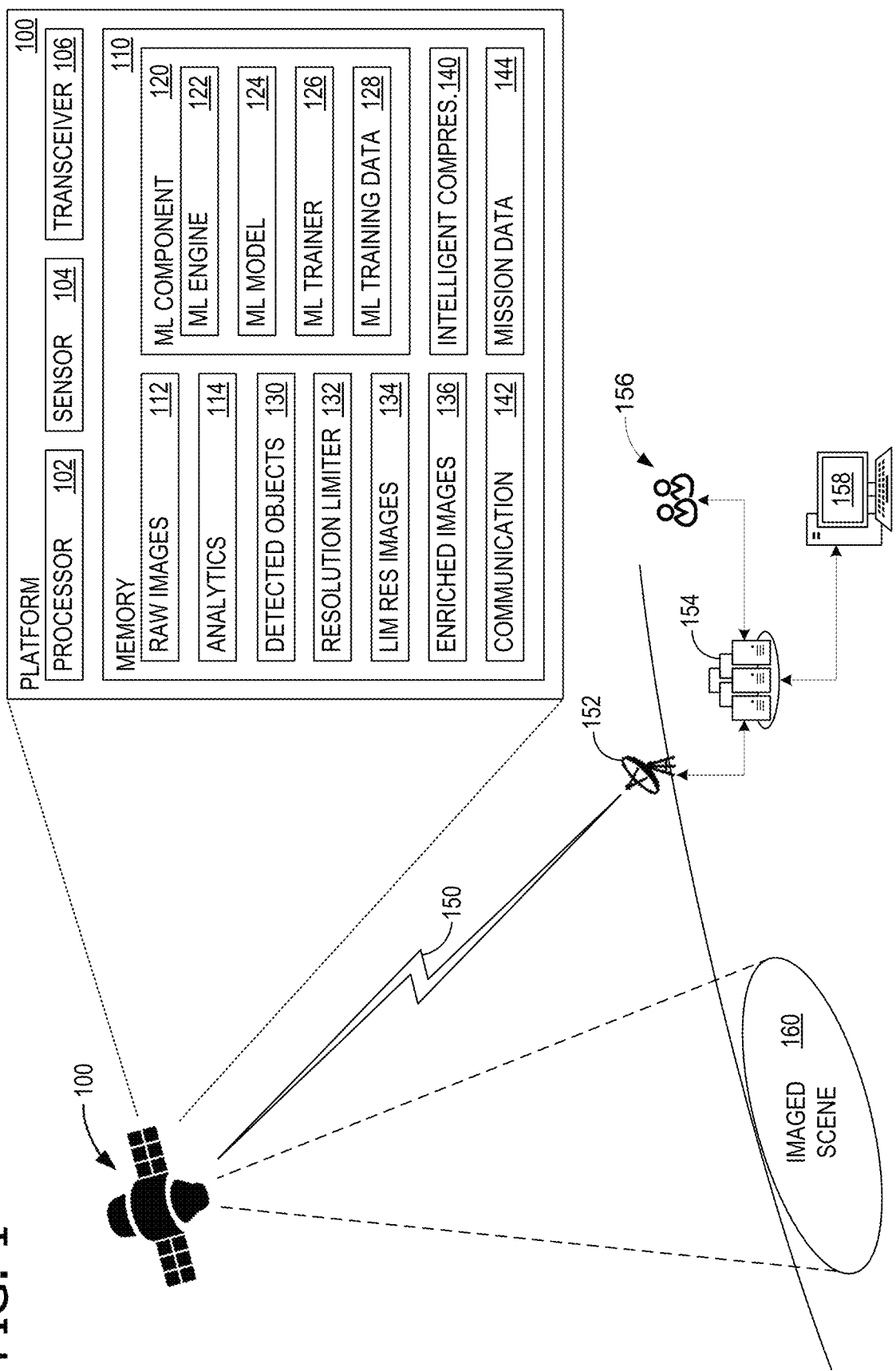
FIG. 1 illustrates an arrangement that advantageously employs on-platform analytics.

The various examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

Satellites are a significant data source for multiple verticals, including agriculture, forestry and land use planning, mining, oil and gas, retail forecasting, emergency management, and other commercial uses, in addition to defense and intelligence applications. The collected imagery is often enriched with analytics, such as by detecting objects within the imagery, and annotating the imagery for downstream users. The democratization of earth observation data (EOD) from orbital platforms has expanded the amount of imaging platforms, along with demand for the imagery across multiple industries. This has created challenges, such as stressing communication channels with higher bandwidth demands for the additional imagery.

Additionally, due to the lack of over-flight restrictions for orbital platforms, the possibility of civilian assets imaging sensitive military sites has led to restrictions that limit the resolution of imagery that may be transmitted down to earth. The resolution limits are specified based on ground sample distance (GSD) at the surface of the earth, and currently are 0.25 m for panchromatic imagery and 1.0 m for multispectral GSD on some locations. Thus, there is a possibility that, in some scenarios, some commercial orbital platforms may be required to down-sample collected imagery to a lower resolution prior to transmitting it to a ground station. For example, an orbital platform may be launched with a sensor capable of providing higher resolution than is currently permitted, in anticipation of future relaxation of the resolution limits, or may need to comply with multiple resolution requirements in different geopolitical jurisdictions. This can degrade potential analytics performance relative to what could be possible with raw images from the on-board sensors.

The sensors on-board some satellites include multi-spectral and hyper-spectral images (together, "multi-spectral"). Due to the additional spectral information contained within the imagery, inferences can be made regarding the imaged scenes. For example, inferring chemical composition and other properties of certain materials is possible, including soil moisture, pH, anticipated crop yield, and vegetation health. Further, the additional information can improve the accuracy of object detection, recognition, and classification algorithms (together "object detection") that are used to enrich the collected images. Analytics often use artificial intelligence (AI) and/or machine learning (ML) algorithms (together, "ML") in object detection. However, the ML models used in the ML engines require training. Generating training sets can be a human-labor-intensive process, selecting and annotating sufficiently large training data sets.

Aspects of the disclosure operate in an unconventional way, to enrich collected images, by performing on-platform analytics for orbital platforms, such as satellites. Aspects of the disclosure operate in an unconventional way, to enhance on-platform analytics with synthetics, for example by training ML models with synthetics and/or by transmitting synthetic ML training date to an orbital platform for on-board training. Aspects of the disclosure operate in an unconventional way, to improve transmission of collected images, by performing intelligent compression and data selection for transmission of images and/or data from an orbital platform to a ground station.

Some aspects disclosed herein are directed to a solution for on-platform analytics that includes: enriching, on-board an orbital platform, collected images using a packaged analytics component; based at least on content of the collected images, selecting a set of the collected images to transmit to a ground station; and transmitting the selected set of the collected images to a ground station. Some aspects disclosed herein are directed to a solution for on-platform analytics that includes: packaging an analytics component for on-platform execution by a platform in orbit; transmitting, from a ground station to the platform in orbit, at least one update selected from the list consisting of: an analytics algorithm update, a machine learning (ML) model, and ML training data; and executing the analytics component with the update.

Some aspects disclosed herein are directed to a solution for on-platform analytics that includes: enriching, on-board an orbital platform, collected images using a packaged analytics component; performing an intelligent compression process on the collected images, wherein the intelligent compression process determines data to transmit to a ground station, based at least on content of the collected images; and transmitting the data to the ground station. Some examples transmit data to the ground station other than images, such as lightweight notifications of extracted entities when bandwidth is at a premium, and transmit the images at a later time, when more bandwidth is available.

FIG. 1 illustrates an arrangement that advantageously employs on-platform analytics. An orbital platform 100 (e.g., a satellite) images an imaged scene 160 on the surface of the earth, and transmits data across a communication channel 150 to a ground station 152. Some examples of communication channel 150 are similar or equivalent to communication channel 926, which is described in more detail in relation to FIG. 9. Ground station 152 forwards the data to a data store 154, and receives uplink data such as updates, tasking, and commands for platform 100. Data store 154 is accessed by users 156, who retrieve images and data supplied by platform 100 and also provide updates, such as algorithm updates and updated ML models. In some examples, data store 154 provides a cloud-based service for managing components of orbital platform 100. Data store 154 also interfaces with a synthetics service 158 to receive updates and training data, and to provide feedback form any on-board ML training on platform 100. Additional detail is provided in the description of FIG. 5. Any of ground station 152, data store 154, and synthetics service 158 can be implemented on one or more examples of computing device 900, which is described in more detail in relation to FIG. 9.

Platform 100 has at least one processor 102 and a memory 110, which may be similar or equivalent to processor 914 and memory 912 of computing device 900, and thus, examples of platform 100 have at least some of the functionality described below for computing device 900. Platform 100 also has at least one sensor 104, and may have additional sensors 104. Some examples of sensor 104 include optical sensors, such as cameras collecting visible light, whether red, green, and blue (RGB) color channels, or other visible color channels. Some examples of sensor 104 include multi-spectral (including hyper-spectral) sensors that collect light outside the visible spectrum. Platform 100 also has at least one transceiver 106 for communicating with ground station 152 and other orbital platforms 100a and 100b. (See FIG. 5.)

Various data sets and logic (e.g., computer-executable instructions), used by processor 102 to perform on-platform analytics, are stored in memory 110. Sensor 104 outputs raw images 112, based upon the image capture capabilities of sensor 104, such as resolution and spectral bands. An analytics component 114 ingests raw images 112 to perform on-board analytics, and detect objects and conditions (extracted entities) that had been captured in the information available within raw images 112. Analytics component 114 leverages an ML component 120, for example an ML engine 122 that uses ML model 124 to detect objects and conditions. In some examples, ML model 124 includes a plurality of ML models, each a tensor, for detecting multiple different objects and conditions (e.g., extracting a plurality of different entities). An ML trainer 126 uses ML training data 128 to perform on-board training, thereby updating or enhancing ML model 124 within platform 100. In general, because weight is such a critical factor for orbital platforms, driving a need to use lighter weight batteries, executable programs, such as analytics component 114 and ML component 120 will be designed for, or selected from among various candidates based on, computational efficiency.

Analytics component 114 outputs detected objects (extracted entities) 130, which is used to enrich the collected images. Additional explanation is provided in the description of FIG. 6. A resolution limiting component 132 reduces the GSD of raw images 112 to produce limited resolution images 134, when raw images 112 have a higher resolution than is permitted for transmitting to earth. Some examples execute analytics component 114 on higher resolution raw images 112, rather than limited resolution images 134, when permitted, and so can potentially produce superior enrichment results (e.g., superior data content within detected objects 130) than would be possible by performing analytics on limited resolution images 134.

Detected objects 130 and limited resolution images 134 are combined to produce enriched images 136. A subset of detected objects 130 and enriched images 136 is selected and compressed by intelligent compression component 140 for transmission to ground station 152. A communication component 142 manages protocol, encryption, scheduling, and other aspects of data flow from memory 110 to transceiver 106, for transmitting data to ground station 152. A mission data set 144 controls tasking of platform 100, and provides information for the selection of location-specific scheduling of analytics algorithm selection, such as selecting ML models that are better-suited for imaged scene 160 (e.g., based on whether platform 100 is over land or over an ocean). In some examples, intelligent compression component 140 leverages mission data set 144 to prioritize data for transmission to ground station 152.

Figure 2:
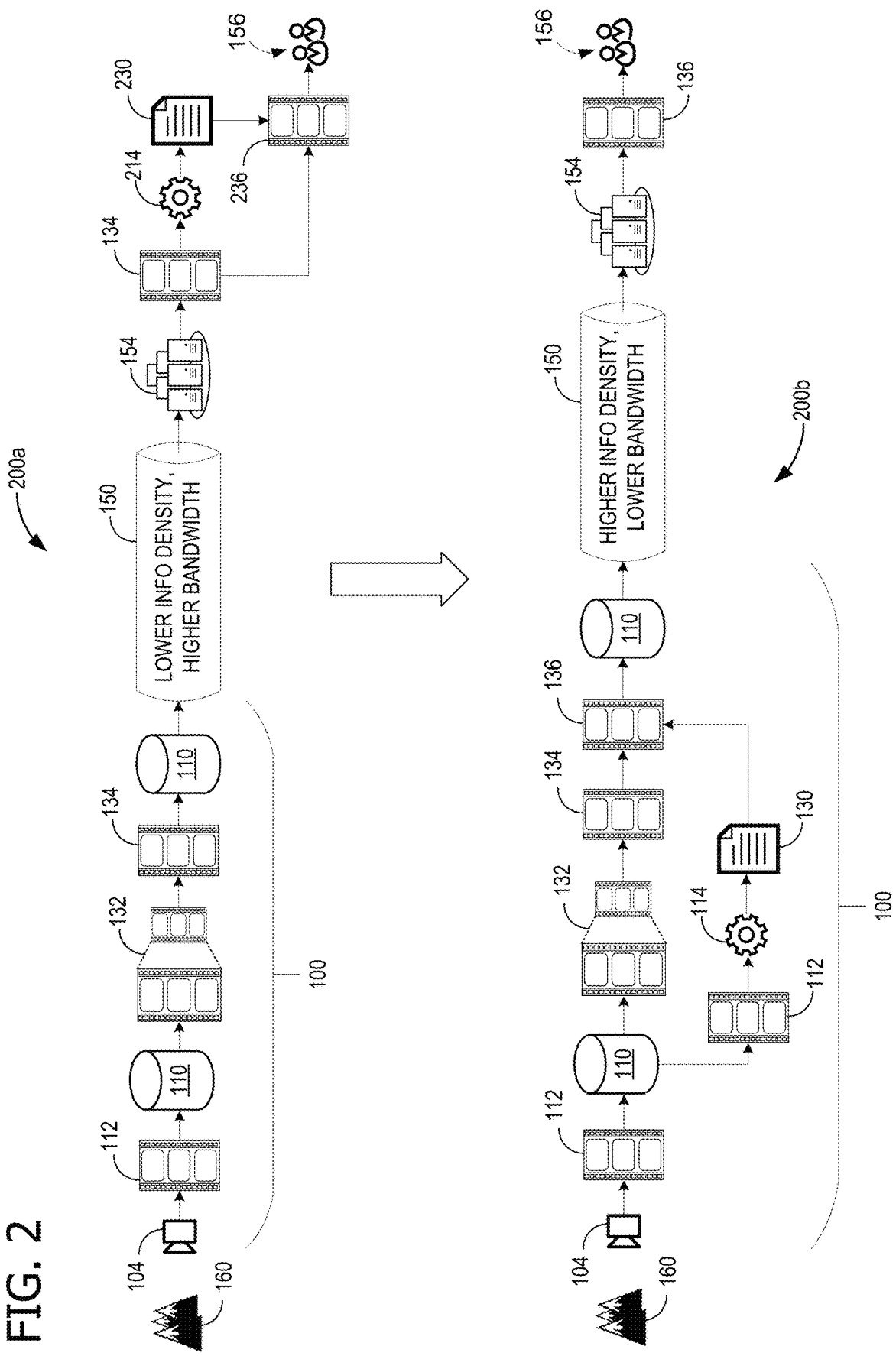
FIG. 2 illustrates a comparison of data flows for ground-based analytics and on-platform analytics.

FIG. 2 illustrates a comparison of data flows 200a and 200b for ground-based analytics and on-platform analytics, respectively. Specifically, comparing data flow 200a with data flow 200b illustrates advantages of on-platform analytics. In data flow 200a, imaged scene 160 is imaged by sensor 104 to produce raw images 112, which is stored in memory 110. Resolution limiting component 132 reduces the GSD of raw images 112 to produce limited resolution images 134, when raw images 112 have a higher resolution than is permitted for transmitting to earth. Limited resolution images 134 are stored in memory 110 for transmission over communication channel 150.

Relative to data flow 200b, data flow 200a passes lower information density data and places a higher demand on bandwidth. Upon arrival at data store 154, a ground-based analytics component 214 ingests limited resolution images 134 and outputs detected objects (extracted entities) 230. Detected objects 230 and limited resolution images 134 are combined to produce enriched images 236 for consumption by users 156.

In data flow 200b, imaged scene 160 is imaged by sensor 104 to produce raw images 112, which is stored in memory 110. Analytics component 114 ingests raw images 112 and outputs detected objects 130. For scenarios in which analytics component 114 can use higher resolution images (e.g., raw images 112 rather than limited resolution images 134) detected objects 130 may have superior information content than detected objects 230. Resolution limiting component 132 reduces the GSD of raw images 112 to produce limited resolution images 134, when raw images 112 have a higher resolution than is permitted for transmitting to earth. Detected objects 130 and limited resolution images 134 are combined to produce enriched images 136. Enriched images 136 are stored in memory 110 for transmission over communication channel 150.

Relative to data flow 200a, data flow 200b passes higher information density data and places a lower demand on bandwidth when only a subset of enriched images 136 are transmitted (via communication channel 150, via ground station 152) to data store 154. For example, with data flow 200a, because the content of produce limited resolution images 134 is not known, ground-based analytics component 214 receives and processes the entire set of limited resolution images 134. This requires the entire set of limited resolution images 134 to be transmitted across communication channel 150, even for scenarios in which limited resolution images 134 contains largely duplicative information, or few objects of interest. In contrast, with data flow 200b, if detected objects 130 indicates that limited resolution images 134 or enriched images 136 contains largely duplicative information, or few objects of interest, fewer images (e.g., only a subset of enriched images 136) are transmitted across communication channel 150. Upon arrival at data store 154, enriched images 136 are available for consumption by users 156.

Figure 3:
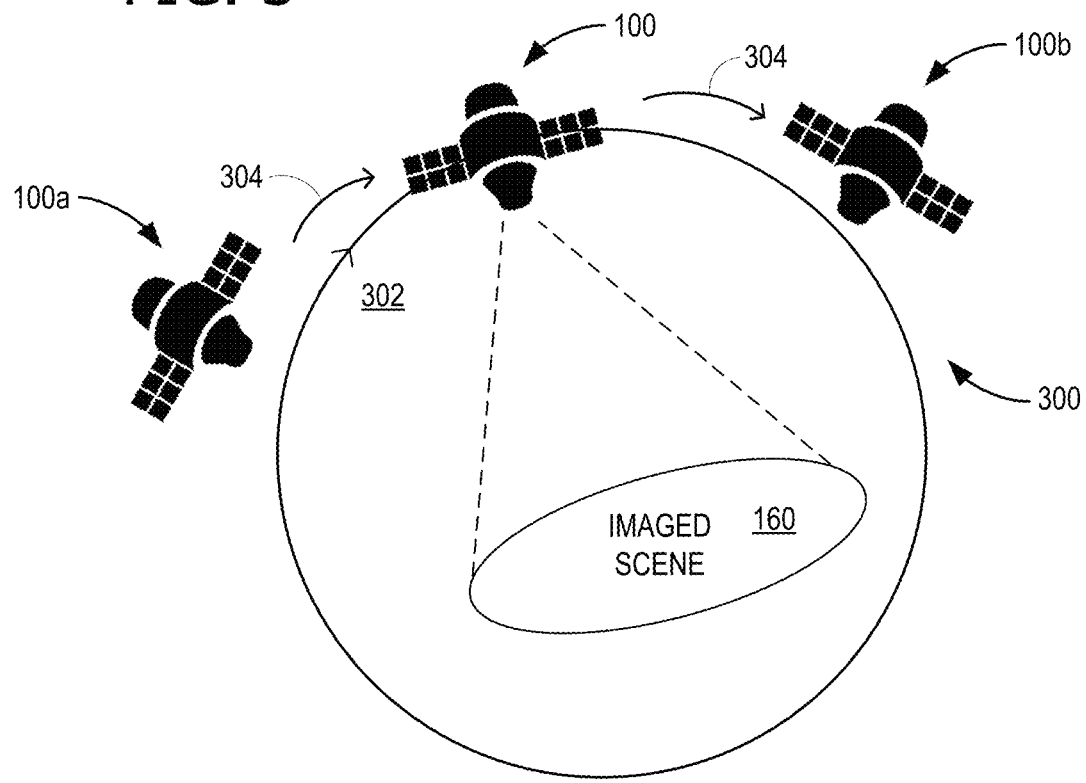
FIG. 3 illustrates revisit time scenarios for orbital platforms.

FIG. 3 illustrates revisit time scenarios for orbital platforms. A satellite constellation 300 includes platform 100 and other orbital platforms 100a and 100b. As illustrated in FIG. 3, platform 100 is in position to collect images of imaged scene 160. A revisit period 302, indicated by the arrowed circle within FIG. 3, is the time required for platform 100 to return, in its orbital navigation path, to a position where it can yet again collect images of imaged scene 160. The inverse of revisit period 302 is the revisit time for platform 100.

Some orbital imaging service providers, however, abstract revisit time based on satellite constellations, based upon the assumption of fungibility of imaging assets. So, for example, due to the orbital spacing of platform 100 and other orbital platforms 100a and 100b, a constellation revisit period 304 is determined by how quickly after platform 100 can no longer view imaged scene 160, one of other orbital platforms 100a and 100b moves into position to begin collecting images of imaged scene 160.

However, with the use of ML component 120 by analytics component 114 on platform 100, if other orbital platforms 100a and 100b do not have exact copies of ML component 120 (e.g., ML model 124 has been trained uniquely), on-platform analytics capability is not fungible. In such scenarios, using the revisit time for a specific satellite (e.g., platform 100) for mission planning may be preferable to using the constellation revisit time. Inter-satellite communication, which can share copies of ML components (e.g., ML model 124), and is described in relation to FIG. 5, can permit the leveraging of satellite constellation 300 for a faster revisit time.

Figure 4:
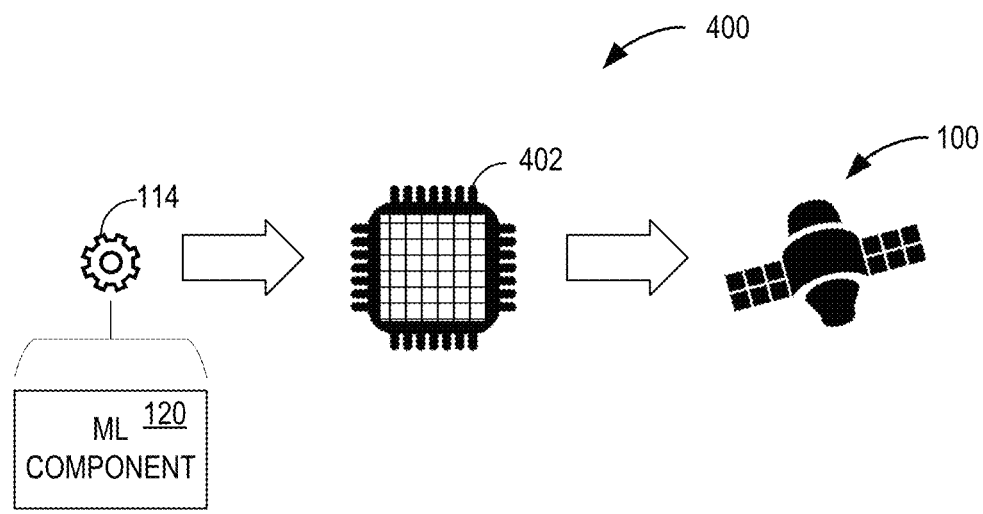
FIG. 4 illustrates an exemplary process of configuring an orbital platform for on-platform analytics.

FIG. 4 illustrates an exemplary process 400 of configuring orbital platform 100 for on-platform analytics. In some examples, analytics component 114, including at least a portion of ML component 120, is implements on a field programmable gate array (FPGA) 402. In such examples, FPGA 402 comprises a portion of memory 110. In some examples, an application specific integrated circuit (ASIC) is used in addition to or in place of FPGA 402. Such solutions can be influenced by the rigorous demands placed on space-compliant hardware, which includes a large number of safety requirements that ensure the safety for platform 100 in a harsh environment. Additionally, FPGA 402 is carefully configured to minimize power consumption, since weight and power budgets aboard orbital platforms are typically quite strict.

One solution for use FPGA 402 includes compressing an image harvesting and analysis engine as analytics component 114, using it to program FPGA 402, and then installing FPGA 402 into platform 100. It should be understood that process 400 is one of multiple solutions for configuring orbital platform 100 for on-platform analytics, and other solutions, such as running analytics component 114 on processor 102 as instructions and data, are also possible.

Figure 5:
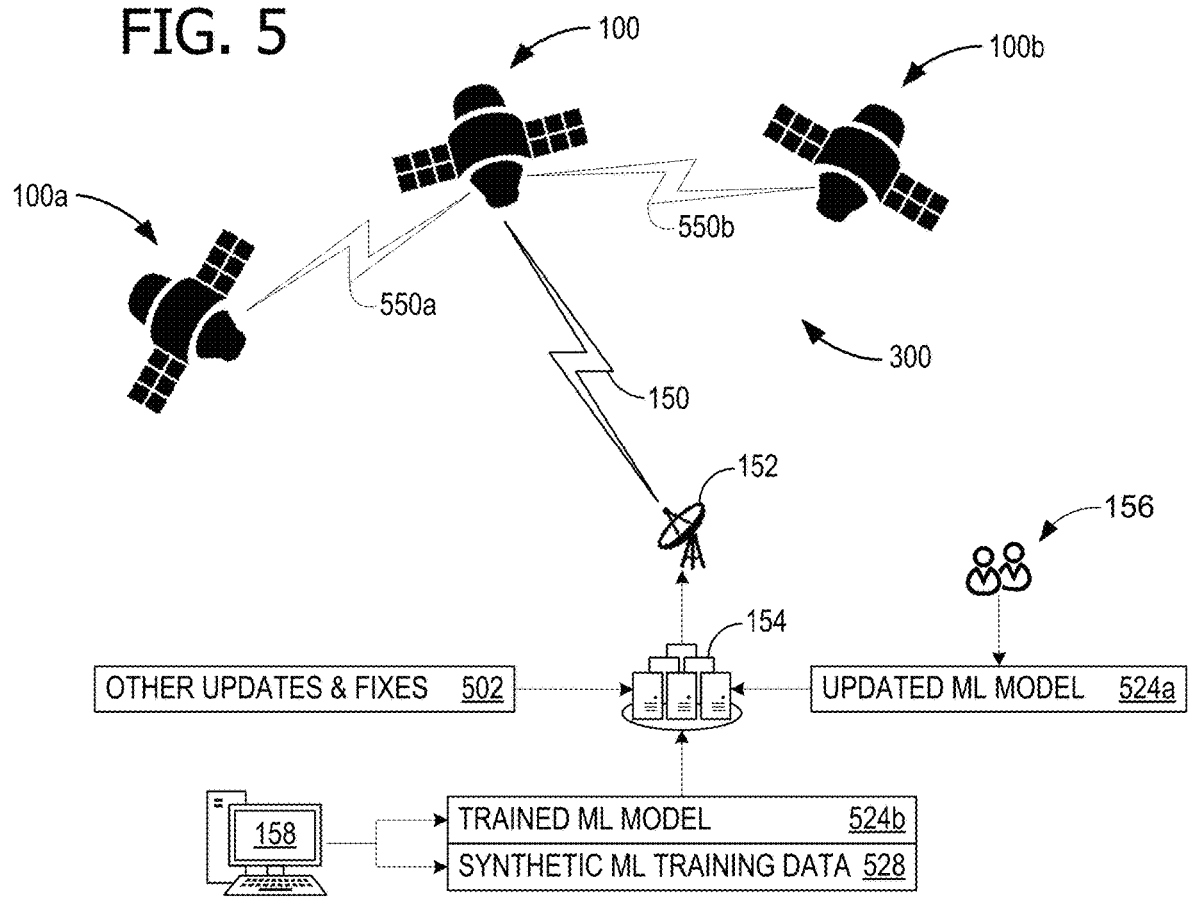
FIG. 5 illustrates updating on-platform analytics capability.

FIG. 5 illustrates updating on-platform analytics capability, such as analytics component 114 and various components of ML component 120. The remoteness of platform 100, while in orbit, creates challenges for updates to the analytics capability that are addressed as described herein. Upon an operator or user of platform 100 determining that a need exists for updating the on-board analytics capability of platform 100, an update is prepared. In some examples, this is an updated ML model 524a provided by users 156, which is sent via ground station 152 to update ML model 124. (See FIG. 1.) In some examples, this is a synthetically trained ML model 524*b* provided by, and trained by, synthetics service 158, which is sent via ground station 152 to update ML model 124. In examples that employ on-board training, synthetics service 158 furnishes synthetic ML training data 528 to enhance, update, or replace ML training data 128. In some examples, updates include other updates and fixes 502 that may, for example, include bug fixes in one or more of analytics component 114, ML engine 122, and ML trainer 126. In some examples, ML engine 122, and ML trainer 126 are managed by cloud-bases services, such as through data store 154. Different platforms can be managed as different edge computing nodes, with differing sets and focuses for artificial intelligence (AI) and ML algorithms.

Synthetics training offers the ability to cost effectively improve analytics capability to enable ML models to make inferences (e.g., detect objects, extract entities, etc.) using spectral bands available from multi-spectral sensors. This enables exploiting information available within an imaged scene, even when the spectral information is outside the range of visible light. Synthetics service 158 also offers cost effective training for images within visible bands (e.g., RGB). Some examples of synthetics service 158 are able to generate large volumes of ML training data at a faster rate than human experts.

Unfortunately, ground stations, such as ground station 152, are geographically dispersed, and may have a full schedule. Therefore, in order to send any updates to platform 100, a communication session is scheduled between platform 100 and ground station 152, based at least on an expected navigational path of platform 100 and the location of ground station 152. After receiving the update, platform 100 is able to execute analytics component 114 with the update.

In some examples, platform 100 is also able to communicate with other orbital platforms 100*a* and 100*b*, using communication channels 550*a* and 550*b*, respectively. This enables platform 100 to transmit (forward) at least a portion of a received update to other orbital platforms 100*a* and 100*b*. After receiving the update from platform 100, other orbital platforms 100*a* and 100*b* are able to execute their own analytics components with the update. This scenario renders satellite constellation 300 into a peer-to-peer network that, in some examples, acts as a distributed computing arrangement.

Figure 6:
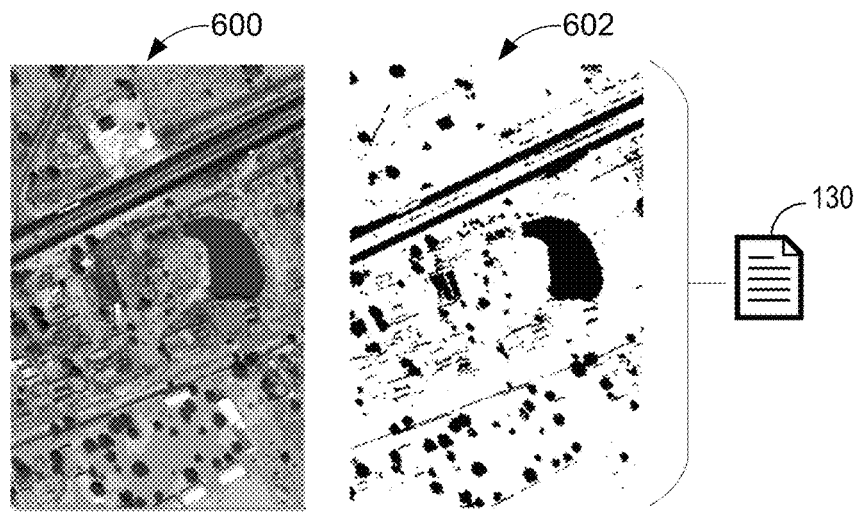
FIG. 6 illustrates an exemplary image along with a set of detected objects (extracted entities)

FIG. 6 illustrates an exemplary collected image 600 along with a set of detected objects within object mask 602. For example, collected image 600 can represent an image within raw images 112 or limited resolution images 134. Object mask 602 includes the size, location, and specific object or condition detected in (extracted from) collected image 600. Information regarding objects within object mask is stored within detected objects 130, and is used to enrich or annotate collected image 600.

FIG. 7 is a flow chart 700 illustrating exemplary operations involved in intelligent configuration management of user devices. In some examples, operations described for flow chart 700 are performed by computing device 900 of FIG. 9. Flow chart 700 commences with operation 702, which includes packaging an analytics component for on-platform execution by a platform in orbit. In some examples, this includes implementing analytics component software components in an FPGA. In some examples, this includes packaging the analytics component to operate within orbital platform environmental constraints. Operation 704 includes placing the platform into orbit, and operation 706 includes collecting images by the platform to produce a set of collected images. In some examples, this includes collecting the collected images with a multi-spectral sensor.

Operation 708 includes, based at least on platform location, selecting at least one ML model to execute. For example, if the platform is over an ocean area, then analytics algorithms for detecting objects in land-based settings have limited usefulness. So, instead analytics algorithms that are suited for multi-spectral images of ocean scenes, such as determining salinity, temperature, and aquatic life concentration will be selected. In some examples, the orbital position of the platform is used as a factor in selecting an ML model to execute. Orbital position can affect the amount of power available from solar panels, such as when the platform is in the earth's shadow. This means that processing requires battery power. Some ML models, that require relatively intensive processing, result in the processor placing a higher power demand on the platform's power reserves, such as batteries. Thus, in some examples, when the platform is in a shadow and running on batteries, an ML model that creates a higher power draw will not be selected for executing, whereas in other conditions, where the platform is receiving full solar power or battery reserves are plentiful, that ML model will be selected to execute.

In general, because weight is such a critical factor for orbital platforms, driving a need to use lighter weight batteries, ML models selected for use on-board the platform will be designed for computational efficiency. As an example of reducing processor demands, RGB-based image classification or object detection/recognition algorithms can be avoided when the platform is on the shadowed (night) side of the earth and collecting infrared (IR) images. Operation 710 includes performing analytics on the collected images using the packaged analytics component, for example, executing the ML model selected in operation 708. Operation 712 includes reducing resolution of the collected images to produce limited resolution images. This is performed in some examples, to comply with legal requirements specifying GSD.

Operation 714 includes enriching, on-board the orbital platform, the collected images using the packaged analytics component. In some examples, this involves annotating the limited resolution images, although in some examples, the original resolution images are annotated. Operation 716 includes, based at least on content of the collected images, selecting a set of the collected images to transmit to a ground station; and operation 718 includes performing an intelligent compression process on the collected images. In some examples, the intelligent compression process determines data to transmit to a ground station, based at least on content of the collected images. That is, there is intelligence involved in ensuring spectral efficiency, for example determining how much of the collected and enriched data to send. Different ground stations may have different data ingestion capabilities, and so the intelligent compression process selects the amount of data to send based at least on the ground station's capability. Some examples, send only identification of image content (e.g., detected objects or conditions) and send collected images that contain certain detected objects or conditions. Some examples identify images containing duplicated enriched data (e.g., detected objects or conditions) and send only a single example, to avoid sending unnecessary duplicates.

Based on the data transmission profile determined in decision operation 720, operation 722 includes transmitting the selected set of the collected images to the ground station. In some examples, the selected set of the collected images that is transmitted to the ground station includes at least a portion of the enriched images that were enriched in operation 714. Alternatively, operation 724 includes transmitting data to the ground station other than images. In some examples, this includes transmitting inference data (enriched data) for a limited set of bands, less than all, from a multi-spectral collected image set. That is, some examples send lightweight notifications of extracted entities when bandwidth is at a premium, and transmit the images at a later time, when more bandwidth is available.

FIG. 8 is a flow chart 8000 illustrating exemplary operations involved in intelligent configuration management of user devices. In some examples, operations described for flow chart 800 are performed by computing device 900 of FIG. 9. Flow chart 800 commences with operations 702-706, as described above for FIG. 7. Operation 802 includes determining a need for an update to the packaged analytics component. In some examples, this includes an analytics algorithm update such as a bug fix or other maintenance. Operation 804 includes determining a need for a new ML model. In some examples, the new ML model adds to the existing ML model set on-board the platform. In some examples, the new ML model is an update that replaces one of the existing ML models on-board the platform. In some examples, the new ML model is trained by a synthetics service prior to transmitting. Operation 806 includes determining a need for ML training data. In this way, the on-platform ML model can be updated with on-platform training. In some examples, a synthetics service provides the ML training data as synthetic training data. A new ML model and ML training data are all updates to the analytics component, since the analytics component includes the ML component. Thus, together, operations 802-806 include determining a need for an update to the packaged analytics component, wherein the update to the packaged analytics component comprises at least one update selected from the list consisting of: an analytics algorithm update, a new ML model, and ML training data.

Operation 808 includes determining platform availability for communication. For example, this may include determining ground station communication capability (e.g., the next visited ground stations), based at least on an expected navigational path of the platform. Operation 810 includes, based at least on an expected navigational path of the platform, scheduling communication with the platform. Operation 812 includes transmitting, from a ground station to the platform in orbit, at least one update selected from the list consisting of: an analytics algorithm update, an ML model update, and ML training data update. In some examples, the update (an ML model update) replaces one of the existing ML models on-board the platform. In some examples, the update (an ML training data update) comprises synthetic training data. Operation 814 includes executing the analytics component with the update, for example performing operation 710 of flow chart 700. Operation 816 includes transmitting (forwarding) at least a portion of the update from the platform to a second orbital platform. Operation 818 includes, executing, with an analytics component on the second orbital platform, the update.

Additional Examples

Some aspects and examples disclosed herein are directed to a system for performing on-platform analytics for collected images, the system comprising: a processor; and a computer-readable medium storing instructions that are operative when executed by the processor to: enrich, on-board an orbital platform, collected images using a packaged analytics component; based at least on content of the collected images, select a set of the collected images to transmit to a ground station; and transmit the selected set of the collected images to the ground station.

Additional aspects and examples disclosed herein are directed to a system for performing on-platform analytics for collected images, the system comprising: a processor; and a computer-readable medium storing instructions that are operative when executed by the processor to: package an analytics component for on-platform execution by a platform in orbit; transmit, from a ground station to the platform, at least one update selected from the list consisting of: an analytics algorithm update, an ML model update, and ML training data update; and execute the analytics component with the update.

Additional aspects and examples disclosed herein are directed to a method of performing on-platform analytics for collected images, the method comprising: enriching, on-board an orbital platform, collected images using a packaged analytics component; based at least on content of the collected images, selecting a set of the collected images to transmit to a ground station; and transmitting the selected set of the collected images to the ground station.

Additional aspects and examples disclosed herein are directed to a method of performing on-platform analytics for collected images comprising: packaging an analytics component for on-platform execution by a platform in orbit; transmitting, from a ground station to the platform, at least one update selected from the list consisting of: an analytics algorithm update, an ML model update, and ML training data update; and executing the analytics component with the update.

Additional aspects and examples disclosed herein are directed to one or more computer storage devices having computer-executable instructions stored thereon for performing on-platform analytics for collected images, which, on execution by a computer, cause the computer to perform operations comprising: enriching, on-board an orbital platform, collected images using a packaged analytics component; based at least on content of the collected images, selecting a set of the collected images to transmit to a ground station; and transmitting the selected set of the collected images to the ground station.

Additional aspects and examples disclosed herein are directed to one or more computer storage devices having computer-executable instructions stored thereon for performing on-platform analytics for collected images, which, on execution by a computer, cause the computer to perform operations comprising: packaging an analytics component for on-platform execution by a platform in orbit; transmitting, from a ground station to the platform, at least one update selected from the list consisting of: an analytics algorithm update, an ML model update, and ML training data update; and executing the analytics component with the update.

Alternatively, or in addition to the other examples described herein, examples include any combination of the following:
performing an intelligent compression process on the collected images, wherein the intelligent compression process determines data to transmit to a second ground station, based at least on content of the collected images;
transmitting the data to the second ground station;
the data comprises inference data for a limited set of bands, less than all bands, from a multi-spectral collected image set;

collecting the set of collected images with a multi-spectral sensor;

based at least on platform location, selecting at least one ML model to execute;

enriching collected images comprises performing analytics on the collected images using the selected ML model;

reducing resolution of the collected images to produce limited resolution images;

transmitting the selected set of the collected images to the ground station comprises transmitting a set of the limited resolution images;

enriching the collected images comprises annotating the limited resolution images;

implementing analytics component software components in an FPGA;

packaging the analytics component orbital platform environmental constraints;

placing the platform into orbit;

the selected set of the collected images that is transmitted to the ground station includes at least a portion of the enriched images;

determining a need for an update to the packaged analytics component;

determining platform availability for communication;

based at least on an expected navigational path of the platform, scheduling communication with the platform;

the update replaces an existing ML model on-board the platform;

the update comprises synthetic training data;

transmitting at least a portion of the update from the platform to a second orbital platform;

executing, with an analytics component on the second orbital platform, the update;

collecting images by the platform; and performing analytics on the collected images using the packaged analytics component.

While the aspects of the disclosure have been described in terms of various examples with their associated operations, a person skilled in the art would appreciate that a combination of operations from any number of different examples is also within scope of the aspects of the disclosure.

Example Operating Environment

Figure 9:
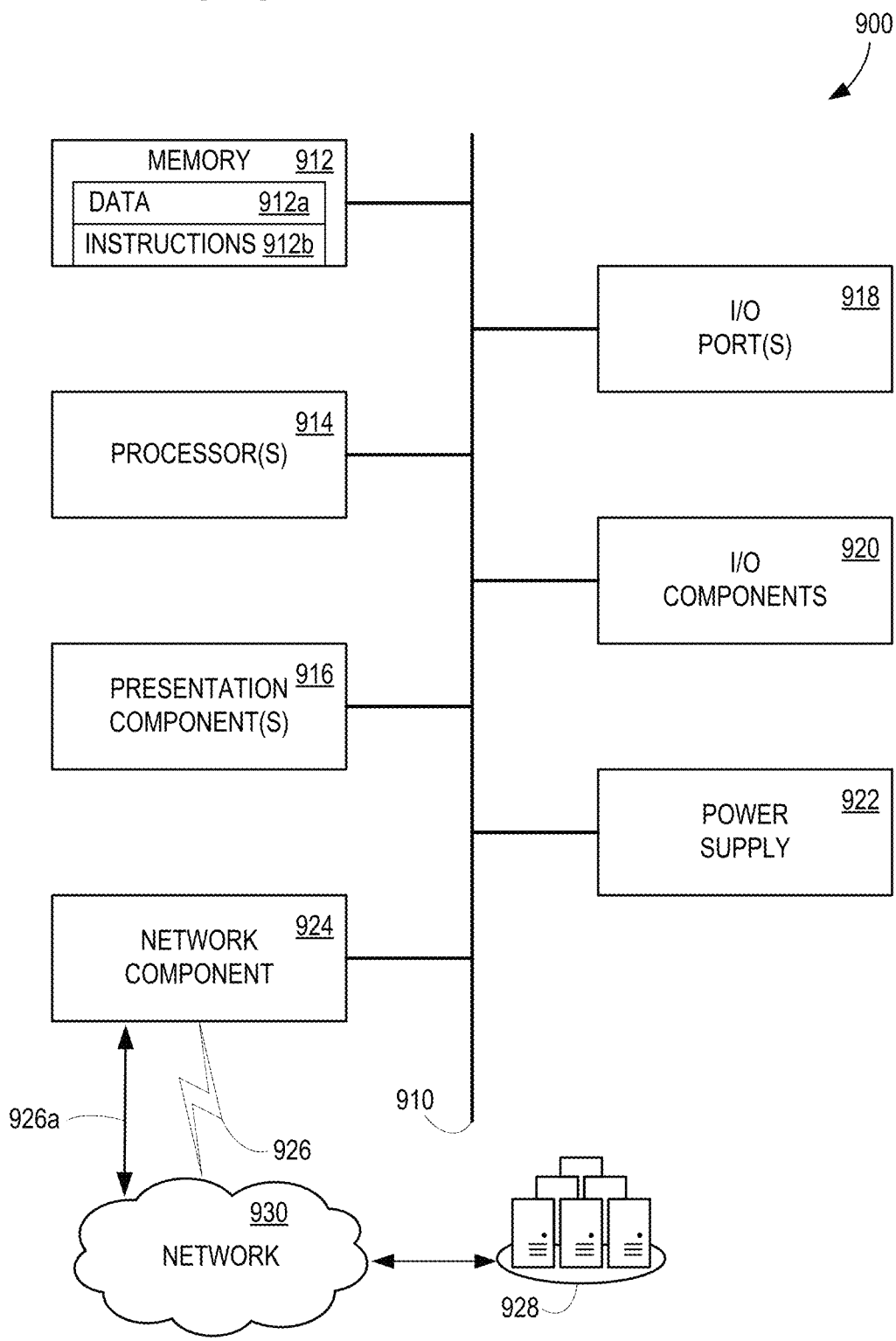
FIG. 9 is a block diagram of an example computing environment suitable for implementing some of the various examples disclosed herein.

FIG. 9 is a block diagram of an example computing device 900 for implementing aspects disclosed herein, and is designated generally as computing device 900. Computing device 900 is but one example of a suitable computing environment and is not intended to suggest any limitation as to the scope of use or functionality of the examples disclosed herein. Neither should computing device 900 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 900 includes a bus 910 that directly or indirectly couples the following devices: computer-storage memory 912, one or more processors 914, one or more presentation components 916, I/O ports 918, I/O components 920, a power supply 922, and a network component 924. While computing device 900 is depicted as a seemingly single device, multiple computing devices 900 may work together and share the depicted device resources. For example, memory 912 may be distributed across multiple devices, and processor(s) 914 may be housed with different devices.

Bus 910 represents what may be one or more busses (such as an address bus, data bus, or a combination thereof). Although the various blocks of FIG. 9 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 9 and the references herein to a "computing device." Memory 912 may take the form of the computer-storage media references below and operatively provide storage of computer-readable instructions, data structures, program modules and other data for the computing device 900. In some examples, memory 912 stores one or more of an operating system, a universal application platform, or other program modules and program data. Memory 912 is thus able to store and access data 912a and instructions 912b that are executable by processor 914 and configured to carry out the various operations disclosed herein.

In some examples, memory 912 includes computer-storage media in the form of volatile and/or nonvolatile memory, removable or non-removable memory, data disks in virtual environments, or a combination thereof. Memory 912 may include any quantity of memory associated with or accessible by the computing device 900. Memory 912 may be internal to the computing device 900 (as shown in FIG. 9), external to the computing device 900 (not shown), or both (not shown). Examples of memory 912 in include, without limitation, random access memory (RAM); read only memory (ROM); electronically erasable programmable read only memory (EEPROM); flash memory or other memory technologies; CD-ROM, digital versatile disks (DVDs) or other optical or holographic media; magnetic cassettes, magnetic tape, magnetic disk storage or other magnetic storage devices; memory wired into an analog computing device; or any other medium for encoding desired information and for access by the computing device 900. Additionally, or alternatively, the memory 912 may be distributed across multiple computing devices 900, for example, in a virtualized environment in which instruction processing is carried out on multiple devices 900. For the purposes of this disclosure, "computer storage media," "computer-storage memory," "memory," and "memory devices" are synonymous terms for the computer-storage memory 912, and none of these terms include carrier waves or propagating signaling.

Processor(s) 914 may include any quantity of processing units that read data from various entities, such as memory 912 or I/O components 920. Specifically, processor(s) 914 are programmed to execute computer-executable instructions for implementing aspects of the disclosure. The instructions may be performed by the processor, by multiple processors within the computing device 900, or by a processor external to the client computing device 900. In some examples, the processor(s) 914 are programmed to execute instructions such as those illustrated in the flow charts discussed below and depicted in the accompanying drawings. Moreover, in some examples, the processor(s) 914 represent an implementation of analog techniques to perform the operations described herein. For example, the operations may be performed by an analog client computing device 900 and/or a digital client computing device 900. Presentation component(s) 916 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 900, across a wired connection, or in other ways. I/O ports 918 allow computing device 900 to be logically coupled to other devices including I/O components 920, some of which may be built in. Example I/O components 920 include, for example but without limitation, a microphone, joystick, game pad, satellite dish, scanner, printer, wireless device, etc.

Computing device 900 may operate in a networked environment via the network component 924 using logical connections to one or more remote computers. In some examples, the network component 924 includes a network interface card and/or computer-executable instructions (e.g., a driver) for operating the network interface card. Communication between the computing device 900 and other devices may occur using any protocol or mechanism over any wired or wireless connection. In some examples, network component 924 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 924 communicates over wireless communication channel 926 and/or a wired communication channel 926a to a cloud resource 928 across network 930. Various different examples of communication channels 926 and 926a include a wireless connection, a wired connection, and/or a dedicated link, and in some examples, at least a portion is routed through the internet.

Although described in connection with an example computing device 900, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality (MR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for performing on-platform analytics for collected images, the system comprising:
 a processor; and
 a computer-readable medium storing instructions that are operative when executed by the processor to:
  package an analytics component for on-platform execution by a platform in orbit;
  determine a need for an update to the packaged analytics component;
  determine platform availability for communication;
  based at least on an expected navigational path of the platform, schedule communication with the platform;
  transmit, from a ground station to the platform in orbit, at least one update selected from the list consisting of:
   an analytics algorithm update, a machine learning (ML) model update, and ML training data update, wherein the at least one update replaces an existing ML model on-board the platform, the platform executing the analytics component with the at least one update.

2. The system of claim 1 wherein the instructions are further operative to:
 receive training data to update the packaged analytics component.

3. The system of claim 1 wherein the at least one update comprises synthetic training data.

4. The system of claim 1 wherein the instructions are further operative to:
 transmit at least a portion of the at least one update from the platform to a second orbital platform.

5. The system of claim 4 wherein the
 second orbital platform executes a second analytics component of the second orbital platform with the at least one update.

6. The system of claim 1 wherein the instructions are further operative to:
 collect images by the platform; and
 perform analytics on the collected images using the packaged analytics component.

7. A method of performing on-platform analytics for collected images, the method comprising:
 packaging an analytics component for on-platform execution by a platform in orbit;
 determining a need for an update to the packaged analytics component;
 determining platform availability for communication;
 based at least on an expected navigational path of the platform, scheduling communication with the platform;
 transmitting, from a ground station to the platform in orbit, at least one update selected from the list consisting of:
  an analytics algorithm update, a machine learning (ML) model update, and ML training data update, wherein the at least one update replaces an existing ML model on-board the platform, the platform executing the analytics component with the at least one update.

8. The method of claim 7 wherein the at least one update comprises synthetic training data.

9. The method of claim 7 further comprising:
 transmitting at least a portion of the at least one update from the platform to a second orbital platform.

10. The method of claim 9 wherein
 the second orbital platform executes a second analytics component of the second orbital platform with the at least one update.

11. The method of claim 7 further comprising:
 collecting images by the platform; and
 performing analytics on the collected images using the packaged analytics component.

12. One or more computer storage devices having computer-executable instructions stored thereon for performing on-platform analytics for collected images, which, on execution by a computer, cause the computer to perform operations comprising:
 packaging an analytics component for on-platform execution by a platform in orbit;
 determining a need for an update to the packaged analytics component;
 determining platform availability for communication;
 based at least on an expected navigational path of the platform, scheduling communication with the platform;
 transmitting, from a ground station to the platform, at least one update selected from the list consisting of:
  an analytics algorithm update, a machine learning (ML) model update, and ML training data update, wherein the at least one update replaces an existing ML model on-board the platform, the platform executing the analytics component with the at least one update.

13. The one or more computer storage devices of claim 12 wherein the operations for determining the need for the update further comprise:
 receiving data from the platform in orbit.

14. The one or more computer storage devices of claim 12 wherein the at least one update comprises synthetic training data.

15. The one or more computer storage devices of claim 12, wherein the operations further comprise:
 transmitting at least a portion of the at least one update from the platform to a second orbital platform,
 the second orbital platform executing a second analytics component of the second orbital platform with the at least one update.

16. The one or more computer storage devices of claim 12, wherein the operations further comprise:
 collecting images by the platform; and
 performing analytics on the collected images using the packaged analytics component.